United States Patent [19]

Ferdinand et al.

[11] 4,384,746
[45] May 24, 1983

[54] DRAWER ASSEMBLY

[75] Inventors: Irwin J. Ferdinand, Glencoe; Richard Sylvan, Glenview; Herbert Baisch, Niles, all of Ill.

[73] Assignee: Hirsh Company, Skokie, Ill.

[21] Appl. No.: 260,054

[22] Filed: May 4, 1981

[51] Int. Cl.³ .................... F16C 29/02; A47B 88/16
[52] U.S. Cl. .................. 308/3.6; 312/338; 312/348; 312/350
[58] Field of Search ............ 308/3 A, 3 B, 3 R, 3.6; 312/330, 338, 348, 350; 24/205 R, 293, 294, 295, 259 FS, 259 R; 403/109, 112

[56] References Cited

U.S. PATENT DOCUMENTS

| | | | |
|---|---|---|---|
| 2,277,702 | 3/1942 | Kennedy et al. | 312/338 |
| 2,277,703 | 3/1942 | Kennedy et al. | 308/3.6 |
| 3,033,638 | 5/1962 | Tomlinson | 312/338 |
| 3,142,517 | 7/1964 | Ward | 308/3.6 |
| 3,527,508 | 9/1970 | Monaco | 308/3.6 |
| 3,589,778 | 6/1971 | Olson | 308/3.6 |
| 3,650,578 | 3/1972 | Del Vecchio et al. | 308/3.8 |

OTHER PUBLICATIONS

Assembly Instructions for "Sears Craftsman ® Drawer for Workbenches and Saw Stands" No. 9-10326.

Primary Examiner—Stuart S. Levy
Assistant Examiner—Thomas R. Hannon
Attorney, Agent, or Firm—Dressler, Goldsmith, Shore, Sutker & Milnamow, Ltd.

[57] ABSTRACT

An assembly for slidably and releasably mounting a drawer in a support frame is provided wherein the drawer has at least one guide member and is slidably engaged with at least one track member carrier by the support frame. The drawer guide member includes an outwardly projecting and forwardly facing stop means and the track member is provided with a resilient clip mounted on the forward end of the track member movable between a first position for engaging the drawer stop means whereby unintentional withdrawal of the drawer from the support frame is prevented and a second position whereby the clip is out of alignment with the stop means to permit removal of the drawer.

7 Claims, 14 Drawing Figures

DRAWER ASSEMBLY

DESCRIPTION

1. Technical Field

This invention relates to a drawer assembly and in particular to a sliding support mechanism for a drawer in a cabinet, frame, or other supporting structure.

2. Background of the Invention

Sliding drawer support structures typically include an assembly of slidably engaged members which can telescope outwardly from a drawer support frame on each side of a drawer that is supported in the frame. Typically the assembly includes, on each side of the drawer, a fixed slide or guide member mounted to the support frame, a drawer slide or guide member mounted to a side of the drawer, and a movable slide member or track which is received partially in the fixed slide on the support frame and partially in the drawer slide on the drawer.

With many types of such conventional drawer support structures, the drawer can be removed from the support frame while leaving the fixed slide and the movable track in the support frame. With some of these drawer support structures, the front of the drawer must be tilted upwardly in order to disengage the drawer slide from a stop on the movable track. The same procedure must be followed when installing the drawer. In other drawer support structures, a spring clip on the movable track must be at least momentarily disengaged with a screwdriver or other suitable tool when removing or installing the drawer.

With some drawer assemblies, the movable track must be initially engaged with the support frame slide and then the slide, together with the movable track, is installed on the support frame. The movable track cannot thereafter be disengaged from the fixed slide on the support frame unless the fixed slide is first removed completely from the support frame.

In some cases, it may be desirable to permit installation of the movable track in, or removal of the movable track from, the support frame fixed slide without requiring the installation or removal, respectively, of the support frame fixed slide. This is especially true in those situations where a support frame and drawers are sold to a consumer in a partially assembled condition and wherein the purchaser must install the drawers. Specifically, it would be desirable in such a situation to provide a means by which the movable track could be inserted in a fixed slide previously mounted to the support frame. It would be desirable if the purchaser's assembly operations could be effected without the use of tools.

Further, it would be desirable to provide a telescoping drawer slide assembly with a movable track having stops at each end for preventing unintentional withdrawal of the movable track from the support frame as well as for preventing unintentional withdrawal of the drawer from the movable track. However, it would be desirable to permit the drawer, as well as the movable track, to be readily and completely disengaged from the drawer support frame by hand and without the use of tools of any kind.

It would also be desirable to permit the drawer to be pulled directly outwardly, normal to the drawer support unit, when removing the drawer without the necessity for tilting the drawer upwardly or downwardly when removing the drawer. This would permit the drawer and drawer support frame to be fabricated with relatively close dimensional tolerances. Further, this would eliminate the need to provide removal clearances between the top (or bottom) of the drawer and the support frame.

SUMMARY OF THE INVENTION

An assembly is provided for slidably and releasably mounting a drawer in a support frame wherein the drawer has at least one drawer guide member on the side of the drawer and wherein the drawer also has an outwardly projecting and forwardly facing first stop means associated with the drawer guide member.

The support frame carries at least one track member to confront the drawer guide member in a generally parallel relationship and to be slidably engaged with the drawer guide member. Typically, the one track member is movable relative to the support frame and is slidably mounted on a fixed guide member mounted to the support frame.

A resilient front clip is mounted on the forward end of the movable track member for confronting the forwardly facing first stop means associated with the drawer guide member. The front clip has a longitudinally extending portion with a first end and a second end. The first end is bent back upon itself to define two confronting gripping surfaces on either side of the track member. The front clip at the second end has an abutment flange projecting therefrom toward the track member.

The front clip is adapted to be moved between first and second positions on the track member. In the first position, the first end of the front clip extends beyond the forward end of the track member and at least a part of the second end of the front clip is held away from the track member so that the front clip flange presents a rearwardly facing abuttment for being engaged with the first stop means on the drawer when the drawer is pulled outwardly—thus preventing unintentional withdrawal of the drawer from the movable track member.

When the front clip is in the second position, the front clip is located inwardly of the first position on the forward end of the track member and the second end of the front clip lies adjacent and generally parallel to the track member whereby the front clip flange is no longer in position to engage the first stop means on the drawer, thus permitting removal of the drawer from the movable track.

The movable track member has a forward end engaging means for engaging the front clip flange when the front clip is in the first position and has a forward end receiving means for receiving the front clip flange when the front clip is in the second position. The front clip flange has a catch means for (1) being engaged by the track member forward end engaging means when the front clip is in the first position to hold the part of the second end of the front clip away from the track member and (2) being received without engagement by the track member forward end receiving means when the front clip is in the second position.

In the preferred embodiment, the track member is movable and is mounted to the fixed frame guide member on the support frame. A second stop means, similar to the first stop means on the drawer, is provided on the fixed frame guide member. The movable track member has, on its rearward end, a rear clip, an engaging means, and a receiving means that are each similar to, but orientated oppositely from, the front clip, the engaging means, and the receiving means, respectively, on the track member forward end.

The front and rear clips may be moved between the first and second positions by manually pushing portions of the clips. No special tools are required. The drawer may be pulled directly out from the support frame in a straight line and completely disengaged from the movable track member if desired. Similarly, the movable track member may be completely removed from the support frame. Assembly or disassembly of the drawer and movable support tracks can be effected without the use of any tools.

Numerous other advantages and features of the present invention will become readily apparent from the following detailed description of the invention and embodiment thereof, from the claims, and from the accompanying drawings.

BRIEF DESCRIPTION OF THE DRAWINGS

In the accompanying drawings forming part of the specification, and in which like numerals are employed to designate like parts about the same.

DESCRIPTION OF THE PREFERRED EMBODIMENT

While this invention is susceptible of embodiment in different forms, there is shown in the drawings and will herein be described in detail a preferred embodiment of the invention. It will be understood, however, that the present disclosure be considered as an exemplification of the principles of the invention and is not intended to limit the invention to the embodiment illustrated.

The precise shapes and sizes of the components herein illustrated are not essential to the apparatus unless otherwise indicated.

It will be understood that the apparatus disclosed herein has certain conventional structural features, the details of which, though not fully illustrated or described, will be apparent to those having the skill in the art and an understanding of the necessary functions of such structures.

For ease of description, the apparatus disclosed herein will be described in the normal operating position and terms such as upper, lower, horizontal, etc., will be used with reference to the normal operating position. It will be understood, however, that the apparatus may be manufactured, stored, transported, and sold in an orientation other than that normal operating position described.

Figure 1:
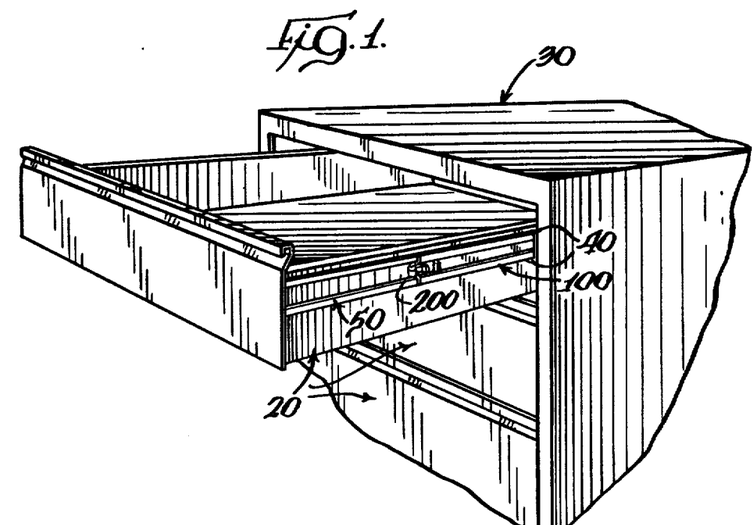
FIG. 1 is a fragmentary, perspective view of the front of a drawer assembly that includes a plurality of drawers slidably mounted within a drawer support frame.

Referring to the drawings, the novel assembly for slidably and releasably mounting a drawer in accordance with the teachings of the present invention is shown in FIG. 1 as being included in an assembly of a plurlity of drawers 20 which are slidably supported in a support cabinet or frame 30. Typically, the support frame 30 includes a pair of spaced-apart, outside frame guide members 40 for each drawer 20. The frame guide members 40 are secured or mounted to the frame 30 in a generally spaced-apart, parallel relationship for accommodating the drawer 20 and certain other sliding support components described in detail hereinafter. The structure of each frame guide member 40 is generally similar to that of the drawer guide members 50 which will next be described.

Each drawer 20 has at least one drawer guide member 50 on the side of the drawer. Typically, two such drawer guide members 50 are provided with one member 50 being located on each side of each drawer 20. In the embodiment illustrated in FIGS. 1 and 2, each drawer guide member 50 is a metal member secured with screws 52 at either end to the side of the drawer 20.

Figure 3:
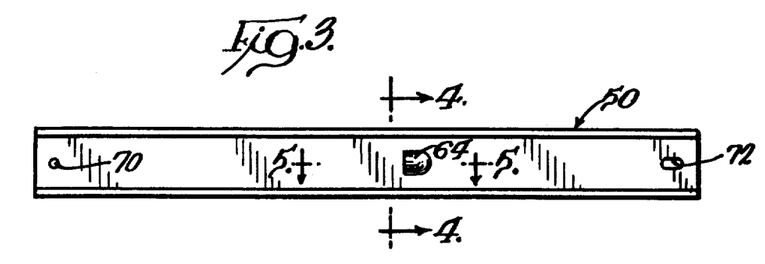
FIG. 3 is an enlarged side view of the drawer guide member alone.
Figures 4, 5, 6:
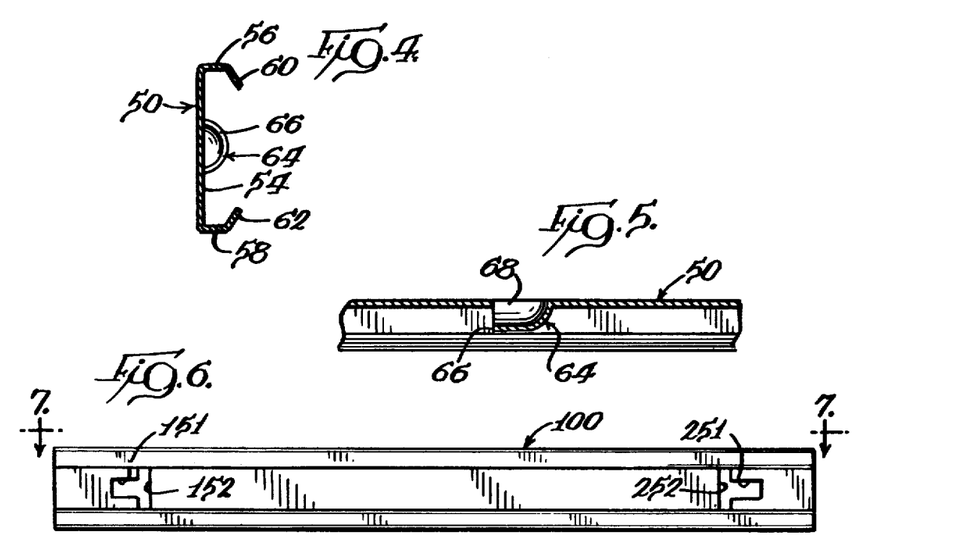
FIG. 4 is an enlarged, cross-sectional view taken generally along the plane 4—4 in FIG. 3.
FIG. 5 is an enlarged, fragmentary, cross-sectional view taken generally along the plane 5—5 in FIG. 3.
FIG. 6 is an enlarged side view of the movable track member alone, without spring clips, said side view taken generally along the plane 10—10 in FIG. 2.

As best illustrated in FIGS. 3, 4, and 5, each drawer guide member 50 has a generally C-shaped or channel-shaped cross-section. The guide member 50 includes a vertical sidewall 54, top and bottom walls 56 and 58, respectively, and top and bottom flanges 60 and 62, respectively. The vertical sidewall 54 includes a forwardly facing first stop means 64 having a front engaging surface 66. In the embodiment illustrated, the stop means 64 is formed in the metal wall 54 by a suitable die so as to leave an aperture 68 in the wall 54 as illustrated in FIG. 5.

The guide member 50 and stop means 64 could be formed as an integral or unitary part of the side of the drawer 20, if desired. Also, the track member 50 and stop means 64 could have other suitable shapes. Also, the stop means 64 could be a unitary part of the drawer 20 while the guide member 50 could be an attached, separate component.

Figure 2:
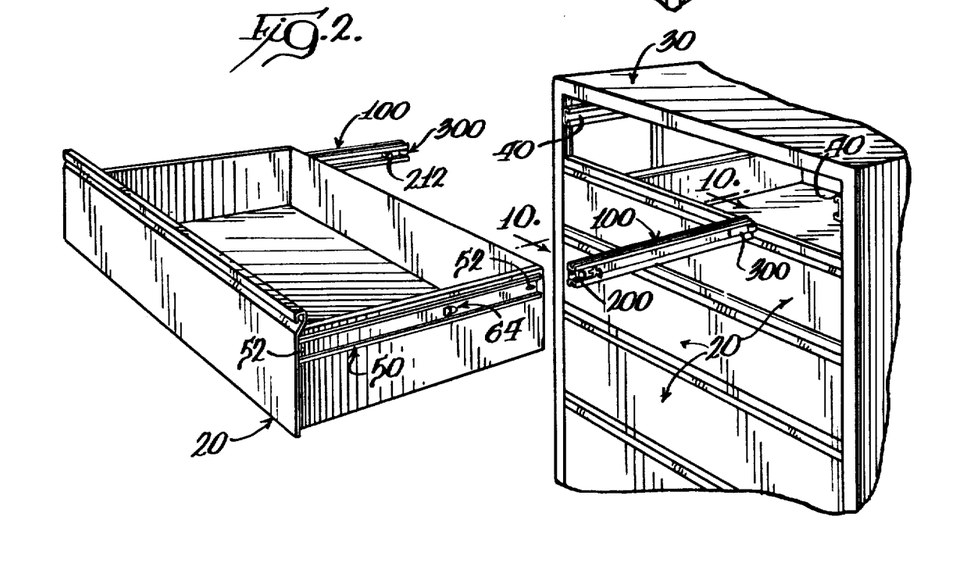
FIG. 2 is a view similar to FIG. 1, but showing the top drawer and some drawer support assembly components removed from the drawer support frame.

As best illustrated in FIGS. 2 and 3, an aperture 70 is provided at the forward end of the guide member 50 and an elongated aperture 72 is provided at the rearward end of the guide member for receiving the screws 52 which secure the guide member 50 to the side of the drawer 20.

As illustrated in FIG. 2, the support frame guide members 40 each have a structure identical to that of the drawer guide members 50 illustrated in FIGS. 2-5 and described in detail above. The support frame guide members 40 are mounted in the support frame 30 so that the stop means (similar to the stop means 64 for the drawer guide members 50, but hidden from view in FIG. 2) face rearwardly rather than forwardly as do the stop members 64 on the drawer guide members 50.

Figure 7:
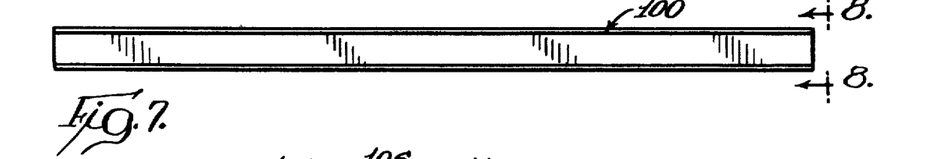
FIG. 7 is a top view of the movable track member taken generally along the plane 7—7 in FIG. 6.
Figure 8:
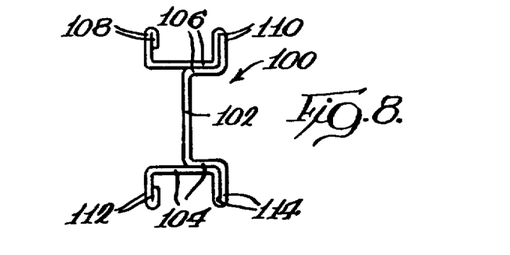
FIG. 8 is a greatly enlarged end view of the movable track member taken generally along the plane 8—8 in FIG. 7.

As best illustrated in FIGS. 1 and 2, a movable track member 100 is provided for being carried by the support frame 30 and for in turn supporting the drawers 20. With reference to FIGS. 2, 6, and 7, the track member 100 includes a generally vertical central wall 102, a bottom horizontal wall 104, and a top horizontal wall 106. Depending upwardly from the top horizontal wall 106 is a rail 108 and a rail 110. Similarly, depending downwardly from bottom wall 104 is a rail 112 and a rail 114. Rails 108 and 112 are coplanar and form a first pair of rails adapted to be received within the drawer guide member 50 as illustrated in FIGS. 1 and 2. Similarly, rails 110 and 114 are generally coplanar and are adapted to be received within the support frame guide member 40 as best illustrated in FIGS. 1 and 2.

On each side of the drawer 20, as best illustrated in FIGS. 1 and 2, one track member 100 is slidably engaged with the drawer guide member 50 and also with the support frame guide member 40. The movable track member 100 is free to slide longitudinally within the support frame guide member 40 while the movable track member 100 and the drawer guide member 50 are free to slide relative to each other.

Figure 10:
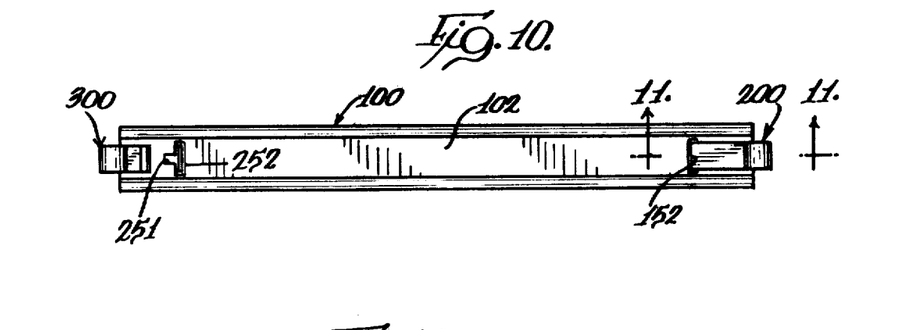
FIG. 10 is a view of the track member taken generally along the plane 10—10 in FIG. 2 with two of the clips of FIG. 9 mounted thereon in a position permitting removal of the drawer from the track member and permitting removal of the track member from the support frame.

According to the teachings of the present invention, novel mechanisms are provided for preventing the track member 100 from being inadvertently withdrawn completely from the support frame guide member 40 and for preventing the drawer 20 from being inadvertently withdrawn completely from engagement with the movable track member 100. To this end, a front clip 200 is mounted on the forward end of the movable track member 100 and a rear clip 300 is mounted on the rearward end of the track member 100 as best illustrated in FIGS. 2 and 10.

To accommodate the mounting of the clips 200 and 300, a novel structure is provided on the track member 100 as best illustrated in FIG. 6. Specifically, at the forward end of the track member 100 (on the left-hand end as illustrated in FIG. 6), first and second apertures 151 and 152 are defined in the vertical wall 102. Alternatively, the vertical wall 102 may be regarded as defining, at the forward end of the track member 100, a single aperture having a first portion 151 and a second portion 152. In the following description of this aperture structure, the terms "aperture first portion 151" and "aperture second portion 152" will be used.

The aperture first portion 151 has a length dimension measured generally normal to the length of the track member 100 that is less than the length dimension of the aperture second portion 152 measured generally normal to the track member length. The aperture first portion 151 is located closer to the forward end of the track member than the aperture second portion 152. The aperture first portion 151 communicates with the aperture second portion 152 to form a generally sideways oriented T-shaped slot in the vertical wall 102 of the track member 100.

At the rearward end of the track member 100, a similar slot or aperture structure is formed with an aperture first portion 251 and an aperture second portion 252. The aperture first portion 251 is closer to the rearward end of the track member 100 than is the aperture second portion 252. The size, configuration, and orientation of the first and second aperture portions 251 and 252 at the rearward end of the track member 100 are otherwise identical to the size, configuration, and orientation, respectively, of the first and second aperture portions 151 and 152 at the forward end of the track member 100.

The resilient clips 200 and 300, illustrated in FIG. 2, are identical in structure. The structure of the clips will be described with reference to the clip 200 mounted on the forward end of the track member 100 in FIG. 2.

Figure 9:
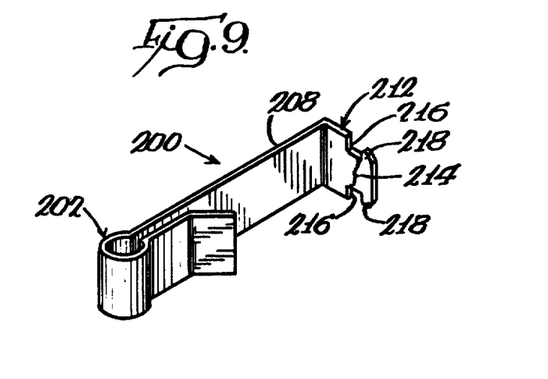
FIG. 9 is a greatly enlarged, perspective view of the novel clip of the present invention.

The clip 200 is best illustrated in the enlarged perspective view of FIG. 9. The clip 200 is constructed from material that, considering the size and shape of the clip 200, imparts a suitable degree of flexibility to the clip 200 for the purposes to be described in detail hereinafter.

Figure 11:
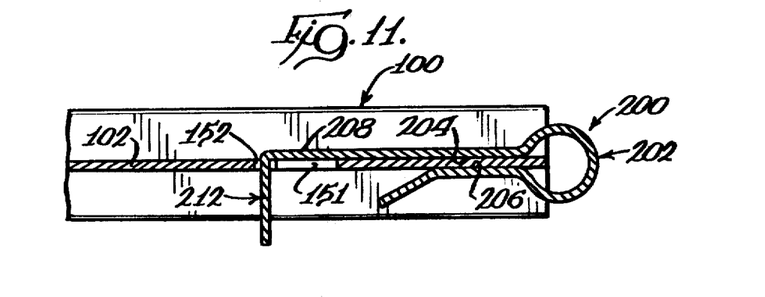
FIG. 11 is a greatly enlarged, fragmentary, cross-sectional view taken generally along the plane 11—11 in FIG. 10.

Typically, the clip 200 is made from sheet steel and is formed into the configuration shown in FIG. 9 by conventional metal forming techniques. The clip 200 has a first end 202 which, as best illustrated in FIG. 11, is positioned adjacent the forward end of the track member 100. The clip 200, at the first end 202, is bent back on itself to define two confronting gripping surfaces 204 and 206 on either side of the track member vertical wall 102.

The clip 200 has a longitudinally extending portion defining a second end 208 and an abutment or flange 212 projecting toward the track member 100.

Figure 13:
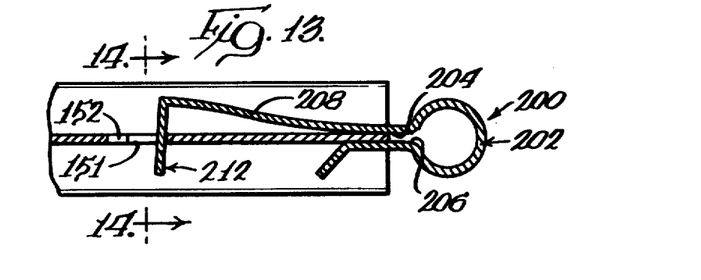
FIG. 13 is a greatly enlarged, fragmentary, cross-sectional view taken generally along the plane 13—13 in FIG. 12.
Figure 14:
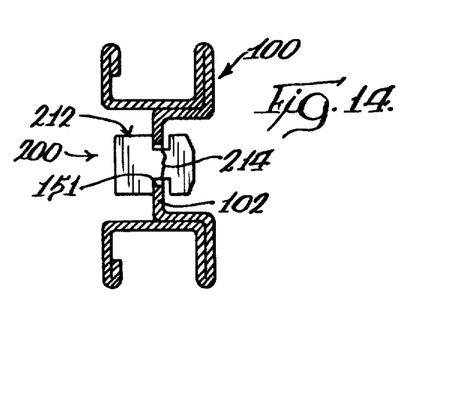
FIG. 14 is a fragmentary, cross-sectional view taken generally along the plane 14—14 in FIG. 13.

The distal end of the clip flange 212 has a vertical dimension greater than the track member aperture first portion 151 and less than the track member aperture second portion 152. The clip flange 212 has a neck portion 214 (FIG. 9) of reduced vertical dimension inwardly of the flange distal end for being received in the track member aperture first portion 151 as illustrated in FIG. 13.

In particular, the clip flange neck portion 214 is defined by a pair of vertically aligned, oppositely opening notches 216 as best illustrated in FIG. 9. The notches 216 cooperate to define in the flange 212 a generally T-shaped tab which includes the neck portion 214 and a pair of outwardly extending shoulder portions 218 at the distal end of the clip flange 212. The vertical dimension across the clip flange shoulder portion 218 is less than the vertical length of the track member aperture second portion 152 and is greater than the vertical dimension of the track member aperture first portion 151. Thus, the distal end of the flange 212 of the clip 200 cannot be inserted through the track member aperture first portion 151.

As is best illustrated in FIGS. 1 and 12-14, the clip 200 may be disposed on the forward end of the track member 100 in a first position wherein the clip first end 202 extends beyond the forward end of the track member 100. The neck portion 214 (FIG. 14) is then received in the track member aperture first portion 151 to position part of the flange 212 away from the track member 100 towards the drawer 20 (FIG. 1) so as to present a rearwardly facing abuttment for being aligned with, and engaged by, the drawer first stop means (stop means 64 illustrated on drawer 20 in FIG. 2). When the drawer 20 is pulled outwardly, the drawer stop means 64 engages the clip flange 212 to prevent unintentional withdrawal of the drawer from the track member 100.

The clip 300 on the rearward end of the track member 100 functions in an analogous manner with respect to presenting an abutment for being aligned with, and engaged by, a rearwardly facing stop means (not visible in FIG. 2) on the support frame guide member 40. This prevents unintentional withdrawal of the track member 100 completely from the support frame 30.

The novel clip structure of the present invention accommodates the quick and easy removal of the drawer, as well as of the track member 100, from the support frame 30 when desired. To this end, each clip 200 and 300 may be moved inwardly along the track member 100 from the first position (illustrated in FIGS. 1 and 12–14) to the second position (illustrated in FIGS. 2 and 10–11). As illustrated for clip 200, movement of the clip 200 to the second position moves the clip neck portion 214 from the track member aperture first portion 151 so that the clip flange 212 is then in registry with the track member aperture second portion 152 (FIG. 11) whereby the flange 212 is urged into the track member aperture second portion 212 by the resiliency of the clip 200. In the second position illustrated in FIGS. 2 and 11, the clip is out of alignment with the drawer first stop means 64 so as to permit removal of the drawer 20.

The clip 300 on the rearward end of the track member 100 can be moved in an analogous manner to that just described for the clip 200 on the forward end of the track member so that the rear clip 300 is moved out of alignment with the rearwardly facing stop means on the support frame guide member 40 to permit the complete withdrawal of the track member 100 from the support frame 30 when desired.

With reference to FIGS. 9–14, it is seen that the configuration of the flange 212 of the first clip 200 functions as a catch means, that the track member first aperture portion 151 functions as a flange engaging means, and that the track member aperture second portion 152 functions as a flange receiving means. Specifically, when the clip 200 is in the first position illustrated in FIGS. 12 and 13, the clip flange 212 notched structure functions as a catch means for being caught or engaged by the track member forward end first aperture portion 151 (functioning as an "engaging means") and this positions a part of the flange 212 at the second end of the clip 200 away from the track member 100 to present an abutment for being engaged by the drawer stop means 64.

When the clip 200 is moved to the second position illustrated in FIGS. 10 and 11, the clip flange catch means is received without engagement by the track member forward end aperture second portion 152 (functioning as a "receiving means") wherein the longitudinally extending end portion 208 of the clip lies adjacent and generally parallel to the track member 100. In this position, the clip flange 212 is no longer aligned to engage the drawer stop means 64 (FIG. 2), thus permitting removal of the drawer 20.

The flange structure of the clip 300, the track member rearward end aperture first portion 251, and the track member rearward end aperture second portion 252 may be similarly regarded as functioning as a catch means, engaging means, and receiving means, respectively, in a manner analogous to the functioning of the front clip flange, the track member forward end aperture first portion 151, and the track member forward end aperture second portion 152, respectively, as described in detail above.

When the drawer 20 and track member 100 are to be initially installed in the support frame 30, the clips 200 and 300 are positioned on the track member 100 as illustrated in FIGS. 2, 10, and 11. In that position, the clips do not present any abutment for being engaged by the stop means on the drawer or on the support frame. The track member 100 can then be readily and slidably engaged with the support frame guide member 40.

Figure 12:
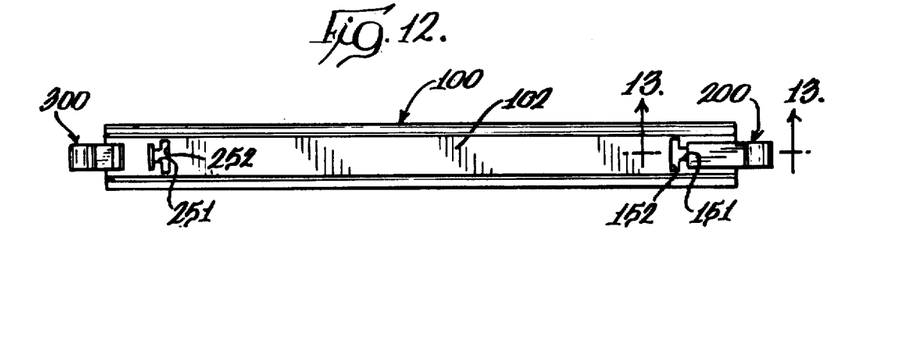
FIG. 12 is a view similar to FIG. 10 but showing the clips moved to a position on the track member in which removal of the drawer from the track member is prevented and in which removal of the track member from the support frame is prevented.

Next, the installer pushes the flange of the rear clip 300 with his finger outwardly toward the support frame guide member 40 and simultaneously exerts a rearwardly directed force so that the clip flange becomes engaged with the track member 100 at the rearward end aperture first portion 251 (FIG. 12). In this position, the clip 300 is now aligned to engage the rearwardly facing stop (not visible in the Figures) on the support frame track member 40 when the track member 100 is pulled forwardly within the support frame guide member 40.

Next, the drawer 20 is slid onto the track member 100 on each side of the drawer with the drawer members 50 slidably engaging the track member 100. When the drawer 20 has been pushed on an amount sufficient to position the forwardly facing stop means 64 behind the track member front clip 200, the installer uses his finger to push the flange 212 of each front clip 200 inwardly toward the associated drawer guide member 50. Simultaneously, the installer exerts a force with the finger on flange 212 toward the forward end of the track member 100 so that the flange 212 is engaged in the track member forward end aperture first portion 151 as illustrated in FIGS. 1, and 12–14.

When the front clip 200 is in the position illustrated in FIGS. 2 and 12–14, the front clip 200 presents an abutment in alignment with the drawer stop means 64 (FIG. 2) for preventing unintentional withdrawal of the drawer from the track member 100.

With both the front clip 200 and the rear clip 300 engaged with the aperture first portions 151 and 251, respectively, the track member 100 is prevented from being removed completely from the support frame 30 and the drawer 20 is prevented from being removed completely from the track member 100 (and hence from the support frame 30).

In the preferred embodiment described above and illustrated in the figures, the track member 100 has been shown as being movable within the support frame guide member 40. It is to be realized that an assembly for slidably and releasably mounting a drawer in a support frame can be provided in accordance with the teachings of the present invention with only two slidably engaged guide members and/or track members instead of three of such members.

For example, with reference to FIG. 2, the support frame guide members 40 may be eliminated and replaced with a modified form of the track member 100. The track member 100 would be modified to permit the mounting of the track member 100 directly to the support frame 30 in place of the support frame guide member 40 illustrated in FIG. 2. Such a modification could be effected by providing appropriate apertures in the guide member 100 for receiving suitable mounting screws. With such screws, the guide member could be fixedly secured to the inside of the support frame 30 in place of the support frame guide member 40.

With such a modified assembly, the rear clip 300 would not be needed. Only the front clip 200 would be provided to function as previously described. Such an assembly would permit the sliding support of the drawer 20 and would prevent unintentional withdrawal of the drawer 20 from the support frame 30. Of course, the amount by which the drawer 20 could be normally pulled out of the support frame 30 would be less than the amount possible with the preferred embodiment illustrated in the figures wherein the support guide member 40 is provided for slidably engaging the track member 100 which in turn slidably engages the drawer 20.

It will readily be observed from the foregoing detailed description of the invention and in the illustrative embodiment thereof that numerous variations and modifications may be effected without departing from the true spirit and scope of the novel concept of the principles of this invention.

What is claimed is:

1. In an assembly for slidably and releasably mounting a drawer in a support frame wherein said drawer has at least one drawer guide member on a side of said drawer, said drawer also having an outwardly projecting and forwardly facing stop means associated with said drawer guide member; the improvement comprising:
   (a) at least one track member carried by said support frame to confront said drawer guide member in a generally parallel relationship, said track member being slidably engaged with said drawer guide member, said track member having a forward end and a portion defining first and second apertures spaced from said forward end; and
   (b) a resilient clip mounted on a forward end of said track member, said clip having a longitudinally extending portion with a first end positioned adjacent said forward end of said track member, said clip at said first end having two confronting gripping surfaces on either side of said track member to hold said clip on said track member, said longitudinally extending portion of said clip having a second end and an abutment flange projecting therefrom towards said track member, said clip abutment flange having a catch means for being engaged by said portion of said track member that defines said first aperture to hold part of said flange away from said track member so that said flange part presents a rearwardly facing abutment in alignment with said stop means on said drawer for being engaged by said stop means when the drawer is pulled outwardly with the result that unintentional withdrawal of said drawer from said track member is prevented, the length of said clip being selected to permit said clip to be moved inwardly on said forward end of said track member to disengage said clip flange catch means and to position said flange in registry with said second aperture of said track member whereby said flange is urged into said second aperture and out of alignment with said stop means to permit removal of said drawer.

2. An assembly for slidably and releasably mounting a drawer in a support frame wherein said drawer has at least one drawer guide member fixed on a side of said drawer, said drawer also having an outwardly projecting and forwardly facing stop means associated with said drawer guide member; said assembly comprising:
   (a) at least one track member carried by said support frame to confront said drawer guide member in a generally parallel relationship and slidably engaging said drawer guide member, said track member having a forward end and defining an aperture adjacent the forward end of said track, said aperture having a first portion and a second portion, said aperture first portion having a length dimension measured generally normal to the track member length that is less than the length dimension of said aperture second portion measured generally normal to the track member length, said aperture first portion being located closer to said forward end of said track member than said aperture second portion; and
   (b) a resilient clip mounted on the forward end of said track member, said clip having a longitudinally extending portion with a first end positioned adjacent said forward end of said track member, said clip at said first end being bent back upon itself to define two confronting gripping surfaces on either side of said track member, said longitudinally extending portion of said clip having a second end and an abutment flange projecting therefrom towards said track member, the distal end of said clip flange having a vertical dimension greater than said track member aperture first portion and less than said track member aperture second portion, said clip flange having a neck portion of reduced vertical dimension inwardly of the flange distal end for being received in said track member aperture first portion whereby, when said clip is in a first position on said track member wherein said clip first end extends beyond said forward end of said track member, said neck portion of said clip flange is received in said track member aperture first portion to position part of said flange away from said track member towards said drawer to present a rearwardly facing abutment for being aligned with and engaged by said stop means on said drawer when the drawer is pulled outwardly with the result that unintentional withdrawal of said drawer from said track member is prevented, the length of said clip being selected to permit said clip to be moved from said first position to a second position inwardly of said first position on said forward end of said track member wherein said clip neck portion is removed from said track member aperture first portion and wherein said clip flange is in registry with said track member aperture second portion whereby said flange is urged into said track member aperture second portion by the resiliency of said clip and out of alignment with said stop means to permit removal of said drawer.

3. The assembly in accordance with claim 2 in which track member aperture is generally T-shaped.

4. The assembly in accordance with claim 2 in which said clip flange neck portion is defined by a pair of vertically aligned, oppositely opening notches forming a T-shaped tab on the distal end of said clip flange, said T-shaped tab including said neck portion and a pair of outwardly extending shoulder portions at the distal end of said clip flange, the vertical dimension across said clip flange shoulder portions being less than the vertical length of said track member aperture second portion and greater than the vertical dimension of said track member aperture first portion, the vertical dimension across said clip flange neck portion being less than the vertical dimension of both said track member aperture first and second portions.

5. An assembly for slidably and releasably mounting a drawer in a support frame wherein said drawer has at least one drawer guide member on a side of said drawer, said drawer also having an outwardly projecting and forwardly facing first stop means associated with said drawer guide member; said assembly comprising:

at least one track member carried by said support frame to confront said drawer guide member in a generally parallel relationship, said track member being slidably engaged with said drawer guide member and having forward and rearward ends;

a resilient front clip mounted on said forward end of said track member for sliding movement along a portion of the length of said track member, said front clip having a longitudinally extending portion with a first end and a second end, said front clip at said first end being bent back upon itself to define two confronting gripping surfaces on either side of said track member, said front clip at said second end having an abutment flange projecting therefrom towards and through said track member with the distal end of said abutment flange projecting away from said drawer guide member, said front clip being adapted to be moved between first and second stable positions on said track member wherein, in said first position, (1) the first end of said front clip extends beyond said forward end of said track member, and (2) at least a part of the second end of said front clip is held away from said track member so that said front clip flange presents a rearwardly facing abutment for being engaged with said first stop means on said drawer when the drawer is pulled outwardly with the result that unintentional withdrawal of said drawer from said track member is prevented and wherein, when said front clip is in said second position, (1) said front clip is located inwardly of said first position on said forward end of said track member and (2) said longitudinally extending portion of said front clip lies adjacent and generally parallel to said track member whereby said front clip flange is no longer in position to engage said first stop means thus permitting removal of said drawer;

said track member having forward end engaging means for engaging said front clip flange when said front clip is in said first position and having forward end receiving means for receiving said front clip flange when said front clip is in said second position; and said front clip flange having a catch means for (1) being engaged by said track member forward end engaging means when said front clip is in said first position to hold the part of the second end of said front clip away from said track member and (2) being received without engagement by said track member forward end receiving means when said front clip is in said second position.

6. The assembly in accordance with claim 5 in which said support frame includes a frame guide member in generally parallel relationship with said one track member and slidably engaged with said one track member;

in which said support frame guide member has an outwardly projecting and rearwardly facing second stop means;

in which said assembly further includes a resilient rear clip mounted on said rearward end of said track member, said rear clip having a longitudinally extending portion with a first end and a second end, said rear clip at said first end being bent back upon itself to define two confronting gripping surfaces on either side of said track member, said rear clip at said second end having an abutment flange projecting therefrom towards said track member, said rear clip being adapted to be moved between first and second positions on said track member wherein, when said rear clip in said first position, (1) the first end of said rear clip extends beyond said rearward end of said track member and (2) at least a part of the second end of said rear clip is held away from said track member so that said rear clip flange presents a forwardly facing abutment for being engaged with said second stop means on said support frame guide member when the drawer is pulled outwardly with the result that the unintentional withdrawal of said track member from said support frame is prevented and wherein, when said rear clip is in said second position, (1) said rear clip is located inwardly of said first position on said rearward end of said track member and (2) said longitudinally extending portion of said rear clip lies adjacent and generally parallel to said track member whereby said rear clip flange is no longer in position to engage said second stop means thus permitting removal of said track member from said support frame;

in which said track member has rearward end engaging means for engaging said rear clip flange when said rear clip is in said first position;

in which said track member has rearward end receiving means for receiving said rear clip flange when said rear clip is in said second position; and in which said rear clip flange has a catch means for (1) being engaged by said track member rearward end engaging means when said rear clip is in said first position to hold the part of the second end of said rear clip away from said track member and (2) being received without engagement by said track member rearward end receiving means when said rear clip is in said second position.

7. The assembly in accordance with claim 6 in which said support frame guide member has a generally C-shaped cross section, in which said drawer guide member has a generally C-shaped cross section, and in which said track member includes a first pair of generally coplaner rails adapted to be received within said drawer guide member and a second pair of generally coplaner rails adapted to be received in said support frame guide member.

* * * * *